F. S. ARNTFIELD.
ELECTRIC WATER HEATER.
APPLICATION FILED MAY 17, 1921.

1,414,494. Patented May 2, 1922.

INVENTOR
F. S. Arntfield
BY J. Edward Maybee
ATTY.

UNITED STATES PATENT OFFICE.

FREDERICK SAMUEL ARNTFIELD, OF TORONTO, ONTARIO, CANADA.

ELECTRIC WATER HEATER.

1,414,494.   Specification of Letters Patent.   Patented May 2, 1922.

Application filed May 17, 1921. Serial No. 470,820.

*To all whom it may concern:*

Be it known that I, FREDERICK S. ARNTFIELD, of the city of Toronto, in the county of York, Province of Ontario, Canada, a subject of the King of Great Britain, have invented certain new and useful Improvements in Electric Water Heaters, of which the following is a specification.

This invention relates to electrical apparatus for heating small quantities of water, and my object is to devise simple and reliable apparatus which will heat a small quantity of liquid to any predetermined temperature and maintain it at that temperature as long as may be desired.

I attain my object by means of the constructions hereinafter described and illustrated in the accompanying drawings in which—

Figure 1:
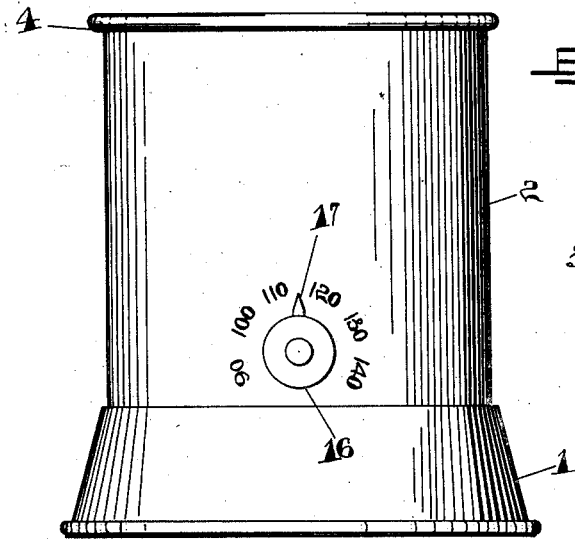
Figure 3:
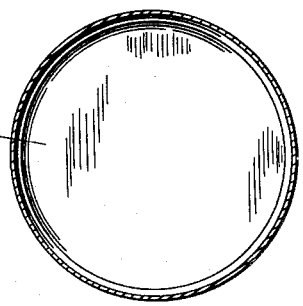
Figure 2:
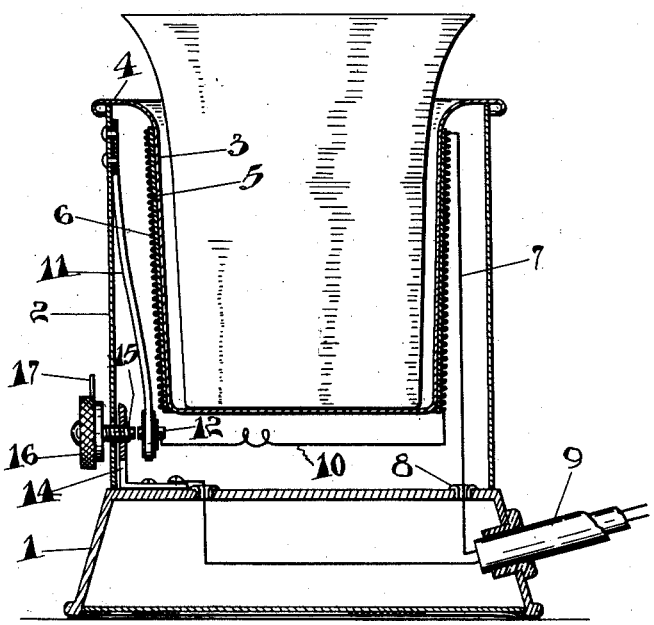

Fig. 1 is a front elevation of the heater;

Fig. 2 a longitudinal section of the same, parts being shown in elevation;

Fig. 3 a front elevation of the thermostatic circuit breaker; and

Figure 4:
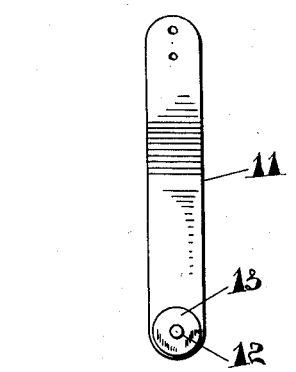

Fig. 4 a horizontal section of the receptacle.

In the drawings like numerals of reference indicate corresponding parts in the different figures.

1 is a base of any suitable shape and preferably circular in plan. On this base is supported a cylindrical casing 2. 3 is an integral cup-shaped receptacle stamped or spun from sheet metal and formed with an outwardly extending annular flange 4 by means of which it is suitably connected to and supported by the cylindrical casing 2. The exterior of the receptacle has an insulating sleeve 5 of mica applied thereto over which is wound an electrical resistance wire and passes through suitable insulating bushings 8 to the flexible conductor cord 9 by means of which it may be connected with any suitable source of current. A second lead 10 is provided connected with the other end of the resistance wire, and in series with this lead is connected a thermostatic circuit breaker. This is preferably arranged as follows: A bi-metallic thermostatic element 11 is secured at its upper end to the casing 2 so that it extends down in the space between the casing and the exterior of the receptacle where it is exposed to the influence of the radiant heat from the resistance wiring. The lower end of this element carries a contact 12, preferably formed as a bolt passing through the end of the element, but insulated therefrom by means of the insulation 13. The outer end of the contact is formed of an iridium platinum alloy. One part of the lead 10 is connected with this contact shown. The other part of the lead is connected with a bracket 14 secured to the base 1. Through this bracket is threaded a screw 15, the end of which forms a contact cooperating with the contact 12. The end of the screw is also formed of iridium platinum alloy. This screw extends through the casing and is provided with a milled head 16 carefully insulated from the screw itself. When the screw 15 and contact 12 are in engagement, current may flow through the electrial resistance. Under the action of heat, however, the thermostatic element bends and will break the contact as soon as a given temperature is reached. This temperature may be regulated by turning the screw 15, which thus varies the amount of movement which the thermostatic element must make before breaking the contact.

A scale is provided on the exterior of the casing as shown in Fig. 1, with which cooperates an index finger 17 on the milled head 16. In this way the device may be set so that the thermostatic element by its operation will permit a desired temperature to be reached and then automatically maintain that temperature by switching the current off and on as the temperature rises and falls.

This device is particularly adapted for heating water for dentists' purposes, for shaving water, and for heating babies' food, the interior of the receptacle being adapted to receive a standard type of feeding bottle.

What I claim as my invention is:—

1. An electric liquid heater comprising a base; an external casing supported on the base; a metal shell forming a receptacle open at its upper end and supported on the casing; an insulating sleeve surrounding the outer surface of the receptacle; and a resistance wire wound on said sleeve.

2. An electric liquid heater comprising a base; an external casing supported on the base; a metal shell forming a receptacle open at its upper end and supported on the casing; an insulating sleeve surrounding the outer surface of the receptacle; a resistance wire wound on said sleeve; leads for connecting said resistance wire with a source of electric energy; and an adjustable thermostatic circuit breaker in series with one of said leads and the resistance wire, said circuit breaker being exposed to radiated heat from the resistance wire.

3. An electric liquid heater comprising a base; a metal shell receptacle open at its upper end and supported from the base; an insulating sleeve surrounding the outer surface of the receptacle; a resistance wire wound on said sleeve; a bi-metallic thermostat element supported by one end in proximity to said resistance wire winding; a contact carried by said element; and fixed contact with which the movable contact co-operates; leads for connecting said resistance wire with a source of electric energy, the contacts aforesaid being in series within one of said leads; and means for adjusting the position of the fixed contact relatively to the movable contact.

4. An electric liquid heater comprising a base; an external cylindrical casing supported on said base; a metal cup-shaped receptacle integrally formed of sheet metal with an outwardly directed flange at its upper end connected to the upper end of the casing; and an electric heating element applied to the outer surface of said receptacle.

5. An electric liquid heater comprising a base; an external casing supported from the base; a cup-shaped metal receptacle supported on and spaced from said casing; an electric heating element applied to the exterior of said receptacle; a bi-metallic thermostat element supported by one end between the receptacle and casing and exposed to radiated heat from the heating element; and circuit controlling means for the heating element; adapted to be opened and closed by said thermostat.

6. In an electric heater, the combination of an open topped receptacle; an external casing supporting the receptacle; an electric heating element for the receptacle located between the receptacle and casing; a thermostatic circuit controlling device located between the casing and receptacle; and circuit controlling means for the heating element adapted to be opened and closed by the thermostat.

7. In an electric heater, the combination of an open topped receptacle; an electric heating element adapted to heat the same; a thermostatic circuit controlling device adapted to be heated by said element; and circuit controlling means for the heating element adapted to be opened and closed by the thermostat.

Signed at Toronto, Ont., this 11th day of May, 1921.

FREDERICK SAMUEL ARNTFIELD.